United States Patent [19]

Isago

[11] 4,300,831
[45] Nov. 17, 1981

[54] SLIT EXPOSURE TYPE ILLUMINATION APPARATUS

[75] Inventor: Kouki Isago, Kawasaki, Japan
[73] Assignee: Ricoh Company, Ltd., Tokyo, Japan
[21] Appl. No.: 128,495
[22] Filed: Mar. 10, 1980

[30] Foreign Application Priority Data

Mar. 16, 1979 [JP] Japan .............................. 54-34183[U]
Mar. 26, 1979 [JP] Japan .............................. 54-39070[U]

[51] Int. Cl.³ ........................................... G03B 27/54
[52] U.S. Cl. ...................................... 355/67; 362/16
[58] Field of Search ............... 355/67, 70, 3 R, 3 FU, 355/105; 362/217, 223, 16

[56] References Cited

U.S. PATENT DOCUMENTS

| | | | |
|---|---|---|---|
| 3,689,760 | 9/1972 | Stewart, Jr. ....................... | 355/67 X |
| 4,095,881 | 6/1978 | Maddox ............................ | 355/67 X |
| 4,143,964 | 3/1979 | Ogura et al. ....................... | 355/67 X |
| 4,178,093 | 12/1979 | Yanagawa et al. ............... | 355/67 X |
| 4,186,431 | 1/1980 | Engel et al. ....................... | 355/67 X |
| 4,239,383 | 12/1980 | Peterson ............................. | 355/67 |

FOREIGN PATENT DOCUMENTS 2844318 4/1979 Fed. Rep. of Germany ........ 355/67

OTHER PUBLICATIONS

IBM Technical Disclosure Bulletin, "Copier Machine Illumination Package", Roberts, vol. 19 No. 2, Jul. 1976, pp. 384, 385.
IBM Technical Disclosure Bulletin, "Copier Illumination Apparatus", Maddox, vol. 18, No. 1, pp. 41–42 Jun. 1975.

*Primary Examiner*—Richard A. Wintercorn
*Attorney, Agent, or Firm*—Wyatt, Gerber, Shoup, Scobey & Badie

[57] ABSTRACT

A slit exposure type illumination apparatus for use in copying machines comprising a reflector having a quadratic reflecting surface, a hollow cylindrical member, at least part of which has the property of reflecting infrared light and allowing visible light to pass through and which is disposed near the focal line of the reflector, and a linear light source which is disposed near or in conformity with the focal line of the reflector, within the hollow member, so as to cause infrared light emitted from the linear light source to return to the linear light source by the hollow member to save electric energy required for the linear light source.

10 Claims, 5 Drawing Figures

SLIT EXPOSURE TYPE ILLUMINATION APPARATUS

BACKGROUND OF THE INVENTION

The present invention relates to an exposure illumination apparatus for use in copying machines and more particularly to an exposure illumination apparatus comprising a semi-cylindrical reflector having a quadratic surface and a linear light source, which is employed as a slit exposure illumination apparatus in electrophotographic copying machines.

Conventionally, as linear light sources in slit exposure illumination apparatus of electrophotographic copying machines, cylindrical light sources having comparatively small diameter light emitting portions, such as halogen lamps and flash lamps, are employed. As is well known, the light emitted from such light sources includes visible light and much infrared light.

Therefore, when the above-mentioned type light sources are employed in a slit exposure illumination apparatus, the original to be copied or the contact glass of the copying machine on which the original is placed may be overheated by the infrared radiation, and, in the case of the glass, said heat is ultimately transmitted to the surface of the original. In order to prevent this, a heat reflective filter which is capable of reflecting infrared light while allowing visible light to pass through is disposed in the optical path of the exposure of the original in the copying machine.

This method is unquestionably effective for preventing the original to be copied from being overheated by infrared light. However, infrared light is apt to be diffused within the copying machine by the filter, and consequently the temperature within the copying machine tends to be elevated.

Furthermore, in the case of a light source employing metallic filaments such as tungsten filaments, it is required to supply heat energy in order to cause the light source to emit light therefrom. In order to do this, generally all the required energy is supplied in the form of electric energy.

Therefore, if infrared light emitted from the light source could be returned to the light source and used for said heating, part of the electric energy required could be saved.

In a conventional slit exposure type illumination apparatus, a heat reflective filter is disposed in the optical path of the exposure illumination so that infrared light emitted from its light source is reflected back to the light source by the heat reflective filter. In practice, however, only part of the infrared light is returned to the light source, and the above-mentioned savings have not been attained sufficiently.

Furthermore, the conventional heat reflector is large in size, and when the heat reflective filter is built into the exposure illumination apparatus, the exposure illumination apparatus tends to be over-sized and expensive.

SUMMARY OF THE INVENTION

It is therefore an object of the invention to provide an improved slit exposure type illumination apparatus which has a high heat preventing effect for preventing the elevation of the temperature of the surface of an original to be copied and the temperature within the copying machine, and a high light emission efficiency for saving electric power required for the illumination apparatus.

One embodiment of a slit exposure type illumination apparatus according to the invention is composed of a semi-cylindrical reflector having a quadratic surface, a linear light source and a transparent cylinder in which the linear light source is disposed. The transparent cylinder is capable of allowing visible light to pass through, while reflecting infrared light and is disposed near the focal point of the reflector having a quadratic surface.

Another embodiment of the invention is composed of a reflector having a quadratic surface, part of the quadratic surface near its focal line being replaced by a first semi-cylindrical reflector which shares the focal line, a linear light source disposed in conformity with the focal line, a second semi-cylindrical reflector which is disposed so as to face the first semi-cylindrical reflector and whose central axis is in conformity with the above-mentioned focal line. The second semi-cylindrical reflector has the property of reflecting infrared light and allowing visible light to pass through.

DESCRIPTION OF THE PREFERRED EMBODIMENTS

Figure 1:
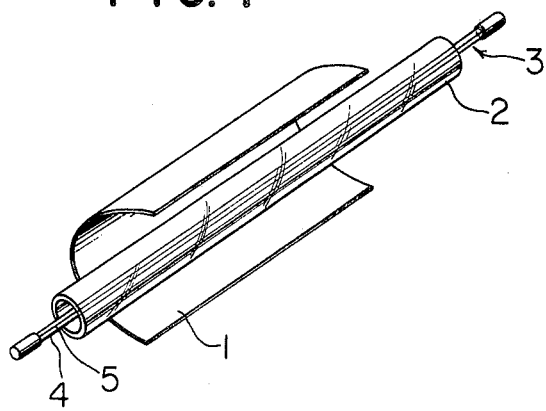
FIG. 1 is a perspective view of an embodiment of a slit exposure type illumination apparatus for use in copying machines according to the invention.
Figure 2:
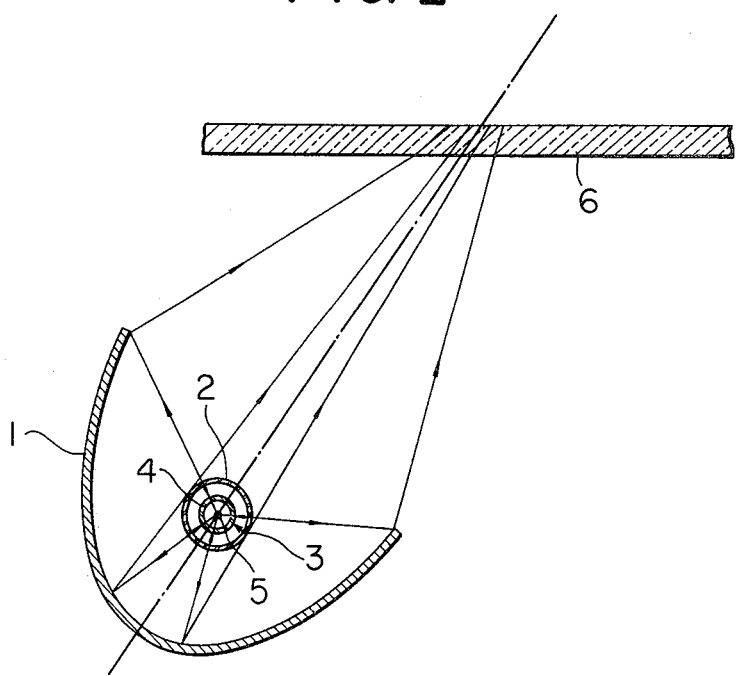
FIG. 2 is a schematic enlarged sectional view of the slit exposure type illumination apparatus of FIG. 1.

Referring to FIG. 1, there is prespectively shown an embodiment of a slit exposure type illumination apparatus according to the invention. FIG. 2 is an enlarged sectional view of the apparatus of FIG. 1.

In FIGS. 1 and 2, reference numeral 1 represents a semi-cylindrical reflector having a quadratic surface (hereinafter referred to as a quadratic surface reflector). In this embodiment, the cross section of the quadratic surface reflector is shaped like part of an oval. A hollow cylinder 2 is disposed around the focal point of the quadratic surface reflector. Inside the hollow cylinder 2, there is disposed a linear light source 3. The hollow cylinder 2 is made of a light transmissible material which allows visible light to pass through, and reflects infrared light like a heat reflective filter. The hollow cylinder 2 can be made of a heat resistant and light transmissible material as a base material, with its inner peripheral surface coated with a film having the same characteristics as that of the heat reflector filter or with its surface coated with indium oxide doped with tin. The hollow cylinder 2 can be constructed by connecting a pair of light transmissible semi-cylinders to each other whose inner peripheral surfaces are coated with a heat reflecting material. A bulb 4 of the linear light source 3 comprises a cylinder having a metallic filament 5 at its center. More particularly, the metallic filament 5 is disposed at the focal point of the quadratic surface reflector 1. Therefore, the center of the hollow cylinder 2 and that of the bulb 4 are both positioned at the focal point of the quadratic surface reflector 1. Furthermore, the outer diameter of the bulb 4 is smaller than the inner diameter of the hollow cylinder 2. In FIG. 2, numeral 6 represents the contact glass on which the original to be copied is placed.

In the above-mentioned construction, since all the rays of light emitted from the metallic filament 5 of the linear light source 3 are normal to the surface of the bulb 4 and the hollow cylinder 2, the angle of incidence of any ray of light to said surfaces is zero. Therefore, when the hollow cylinder 2 has an optical characteristic of allowing visible light to pass through and reflecting infrared light, visible light passes through the hollow cylinder 2, while infrared light is reflected from the hollow cylinder 2 and is returned to the metallic filament 5. As in the case of the conventional exposure illumination apparatus, visible light is reflected from the quadratic surface reflector 1 to the surface of an original to be copied for the slit exposure of the original. In this case, since all the rays of light which may be diffused to the surface of the original and within the copying machine are visible light, the temperatures of the surface of the original and of the copying machine are not elevated to any significant degree. This helps to attain a high reliability of the exposure illumination apparatus.

Furthermore, since all the infrared light emitted from the metallic filament 5 is returned to the metallic filament 5, the elevation of the temperature of the metallic filament 5 is accelerated, so that electric energy required to heat the metallic filament 5 can be saved considerably.

Figure 3:
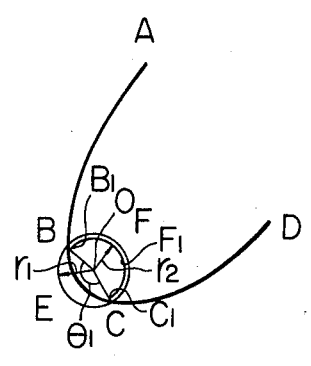
FIG. 3 is a schematic sectional view of a semi-cylindrical reflector having a quadratic surface applicable to another embodiment of the invention.

Referring to FIG. 3, there is shown a schematic cross section of a quadratic surface reflector for use in another embodiment of the invention. In FIG. 3, a curve ABCD is a quadratic curve having a focal point O, and may be formed by such curves as part of an ellipse. A closed curve BECFB is a circle whose center is O and whose radius is $r_1$. Supposing that the intersection points of the circle BECFB and the curve ABCD are B and C, the cross section of the quadratic surface reflector is in the shape of the compound curve ABECD. In other words, in the quadratic surface reflector employed in this embodiment, part of the quadratic surface ABCD is replaced by an arc surface BEC which is projected outwards from the quadratic surface ABCD.

Referring to FIG. 3, the shape of the cross section of a heat reflective filter employed in this embodiment will now be explained. An arc having a radius $r_2$ is drawn with its center at the point O. Suppose that the intersection point of the arc and lines BO and CO are $B_1$ and $C_1$, and an arc $B_1F_1C_1$ is schematically the shape of the cross section of the heat reflective filter. The radius of the heat reflective filter can be set at $r_1$. However, both $r_1$ and $r_2$ have to be greater than the diameter of the bulb of the linear light source in the embodiment.

Figure 4:
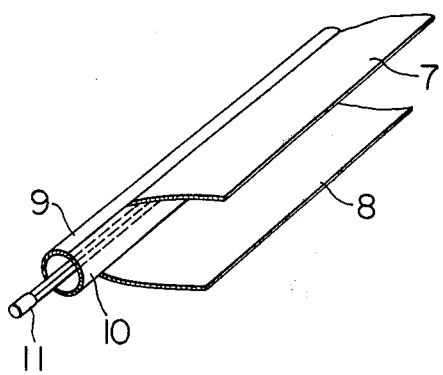
FIG. 4 is a perspective view of the slit exposure type illumination apparatus of FIG. 3 including a partial cutaway view thereof.

In FIG. 4, there is perspectively shown the embodiment of the slit exposure type illumination apparatus of FIG. 3. In FIG. 4, numerals 7 and 8 represent a quadratic surface reflector. Numeral 9 represents a semicylindrical reflective, numeral 10 a heat reflector filter, and numeral 11 a linear light source which is positioned at the focal line of the quadratic surface reflector 7 and 8 of the semi-cylindrical reflector 9. The heat reflective filter 10 is made of a heat resistant semi-cylindrical plate, such as glass, whose inside or outside is coated with a material which allows visible light to pass through and reflects infrared light.

Figure 5:
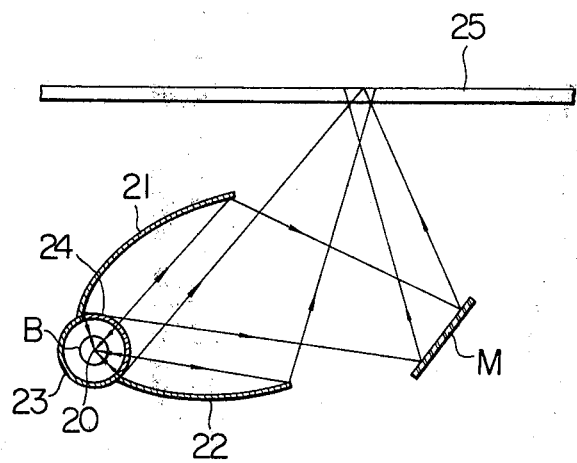
FIG. 5 is a schematic sectional view of the slit exposure type illumination apparatus of FIG. 3.

Referring to FIG. 5, the operation and effects of the embodiment of FIG. 4 will now be explained. In FIG. 5, since each part of the slit exposure type illumination apparatus of FIG. 4 is more specifically defined, different reference numerals from those in FIG. 4 are employed as follows:

In the embodiment of FIG. 5, two reflectors 21 and 22 whose cross sections are in the shape of part of an ellipse are disposed so as to share their focal line 20. A metallic filament to be used as a linear light source is disposed so as to coincide with the focal line 20. Furthermore, a bulb B of the linear light source and a semi-cylindrical reflector 23 and a heat reflector filter 24 or a semi-cylindrical member are disposed in such a manner that their centers also coincide with the focal line 20. In this embodiment, the semi-cylindrical reflector 23 and the heat reflective filter or the semi-cylindrical member 24 have equal radius.

In this construction, since the rays of light emitted from the light emitting portion of the bulb B are normal to the surface of the bulb B, the heat reflective filter 24 and the semi-cylindrical reflector 23, the angle of incidence of light to them is zero. Therefore, infrared light incident upon the heat reflective filter 24 and the semi-cylindrical reflector 23 are completely reflected so that the metallic filament is further heated by the reflected infrared light. On the other hand, visible light incident upon the heat reflective filter 24 passes through the heat reflective filter 24. Out of the visible light passing through the heat reflective filter 24 rays of visible light reflected by the reflectors 21, 22 illuminate an effective slit for slit exposure and the other rays of visible light are diffused within the copying machine or over the surface of the original to be copied. However, since they do not include infrared light, the temperature of the original and of the inside of the copying machine are not elevated to any significant degree. In contrast with this, the rays of light reflected from the semi-cylindrical reflector 23 heat only the metallic filament and are not diffused to the original surface 25 and into the copying machine. In FIG. 5, the double arrows indicate that infrared light is returned to the metallic filament, while the single arrows indicate that visible light is reflected to the original surface 25. In this embodiment, even if infrared light does not return to the filament directly by passing through its coils, all infrared light is reflected by the heat reflective filter 24 and the vast majority of it is eventually caused to return to the filament. Again in this embodiment, since all the rays of light which may be diffused to the surface of the original and within the copying machine are visible light, the temperatures of the surface of the original and the copying machine are not elevated to any significant degree. This helps to attain a high reliability of the slit exposure type illumination apparatus.

Furthermore, since the vast majority of the infrared light emitted from the metallic filament is returned to the metallic filament, the elevation of the temperature of the metallic filament is accelerated, so that electric energy required to heat the metallic filament can be saved considerably.

What is claimed is:

1. A slit exposure type illumination apparatus for use in copying machines comprising:
   a reflector having a quadratic reflecting surface,
   a hollow member made of a material which allows visible light to pass through and reflects infrared light and which is disposed near the focal line of said reflector, and a linear light source which is disposed inside said hollow member.

2. A slit exposure type illumination apparatus for use in copying machines as in claim 1, in which said reflector has an elliptic surface.

3. A slit exposure type illumination apparatus for use in copying machines as in claim 1, in which said reflector has elliptic surface divided in two, each of which shares an identical focal line of said reflector.

4. A slit exposure type illumination apparatus for use in copying machines as in claim 1, in which said hollow member is made of a light transmissible material which is coated with indium oxide doped with tin.

5. A slit exposure type illumination apparatus for use in copying machines as in claim 2, in which the central axis of said hollow member is in conformity with one focal line of said reflector.

6. A slit exposure type illumination apparatus for use in copying machines as in claim 3, in which said hollow member is a cylinder.

7. A slit exposure type illumination apparatus for use in copying machines as in claim 4, in which said reflector having two divided elliptic surfaces is connected to a semi-cylindrical reflector which is projected outwards in the opposite direction of said focal line at the divided opposite edges of said reflector.

8. A slit exposure type illumination apparatus for use in copying machines as in claim 4, in which said hollow member comprises a semi-cylindrical member which is connected to said two divided elliptic surfaces of said reflector and which is projected in the direction of said focal line.

9. A slit exposure type illumination apparatus for use in copying machines as in claim 4 or 8, in which said semi-cylindrical reflector and said semi-cylindrical member have an identical center and an equal radius.

10. A slit exposure type illumination apparatus for use in copying machines as in claim 1, in which the radius of said semi-cylindrical member is smaller than that of said semi-cylindrical reflector.

* * * * *